United States Patent [19]

Cheng et al.

[11] Patent Number: 5,109,063
[45] Date of Patent: Apr. 28, 1992

[54] VINYL ACETATE/ETHYLENE/NMA COPOLYMER EMULSION FOR NONWOVEN BINDER APPLICATIONS

[75] Inventors: Tze-Chiang Cheng, Allentown; Phillip A. Mango, Fogelsville, both of Pa.

[73] Assignee: Air Products and Chemicals, Inc, Allentown, Pa.

[21] Appl. No.: 625,328

[22] Filed: Dec. 10, 1990

[51] Int. Cl.⁵ .............................................. C08L 33/00
[52] U.S. Cl. .................................... 524/820; 524/747
[58] Field of Search ................................ 524/820, 747

[56] References Cited

U.S. PATENT DOCUMENTS 4,332,850  6/1982  Iacoviello ........................... 428/288
4,449,978  5/1984  Iacoviello ........................... 604/372
4,698,384 10/1987  Mao .................................... 524/458

*Primary Examiner*—Joseph L. Schofer
*Assistant Examiner*—J. M. Reddick

*Attorney, Agent, or Firm*—Michael Leach; James C. Simmons; William F. Marsh

[57] ABSTRACT

A process for making an aqueous vinyl acetate/ethylene/N-methylolacrylamide copolymer emulsion comprising:

(a) adding an initial charge containing all the vinyl acetate monomer to be polymerized and an effective amount of an emulsifying system consisting essentially of an anionic surfactant, especially a salt of an alkylphenoxy poly(ethyleneoxy) sulfate containing about 3-5 ethyleneoxy units, (b) pressurizing the reactor with sufficient ethylene to yield a copolymer having the desired Tg, (c) initiating polymerization at a temperature from 45° to 85° C., and (d) continuing polymerization at a temperature from 45° to 85° C., while continuously adding N-methylolacrylamide over a period of time such that the free vinyl acetate monomer content of the reaction medium is about 2-4% upon completion of the N-methylolacrylamide addition.

9 Claims, No Drawings

VINYL ACETATE/ETHYLENE/NMA COPOLYMER EMULSION FOR NONWOVEN BINDER APPLICATIONS

FIELD OF THE INVENTION

The present invention relates to vinyl acetate/ethylene/N-methylolacrylamide copolymer emulsions suitable for use as a nonwoven binder.

BACKGROUND OF THE INVENTION

The use of vinyl acetate/ethylene/N-methylolacrylamide (VAE/NMA) copolymer emulsions for making nonwoven products is a well known practice in the industry. One particular nonwovens application involves industrial and personal wipes. The industry requires that such wipes bonded with VAE/NMA copolymer binders demonstrate the following properties: a soft feel; good dry, wet and solvent tensile strengths; and good absorbency rate. In particular, the wet tensile strength and absorbency properties are the most important consideration. The copolymer binder must show good adhesion to cellulosic fibers and the copolymer emulsion must have good mechanical stability, good viscosity stability and a small mean particle size and broad size distribution.

U.S. Pat. No. 4,332,850 discloses a "cold" (10°-35° C.) initiation polymerization process for making VAE/NMA copolymer emulsions. Runs 1 and 2 of Example 1 show the use of Triton 301 surfactant as the sole emulsifying agent. Triton 301 surfactant is identified as the sodium salt of alkylaryl polyether sulfate.

U.S. Pat. No. 4,449,978 discloses a nonwoven product formed from a nonwoven web of fibers bonded together with a binder comprising a vinyl acetate/ethylene/N-methylolacrylamide/acrylamide copolymer.

U.S. Pat. No. 4,698,384 discloses a copolymer emulsion for bonding nonwoven products comprising an aqueous medium having colloidally dispersed therein a copolymer consisting essentially of vinyl acetate, 5 to 35 wt % ethylene and 2 to 10 wt % of an amide functional crosslinking monomer which can be NMA, the copolymer emulsion prepared in the presence of 0.1 to 1 wt % polyvinyl pyrrolidone, based on vinyl acetate in the copolymer. Such emulsion binder copolymers demonstrated improved solvent resistance. Run A in Example 2 shows the preparation of a VAE/NMA copolymer emulsion using Polystep B-27 surfactant. Of the total vinyl acetate monomer used in the polymerization reaction, 20% was added with the initial charge and, upon initiation, the remaining 80% was added continuously over a four hour period.

SUMMARY OF THE INVENTION

The present invention provides a process for making an aqueous VAE/NMA copolymer emulsion comprising:
(a) adding to a polymerization reaction vessel an initial charge containing all the vinyl acetate monomer to be polymerized and an effective amount of an emulsifying the system consisting essentially of an anionic surfactant, especially a salt of an alkylphenoxy poly(ethyleneoxy) sulfate containing about 3-5 ethyleneoxy units,
(b) pressurizing the reactor with sufficient ethylene to provide a copolymer with the desired Tg,
(c) initiating the polymerization reaction at a temperature from 45° to 85° C., and
(d) continuing polymerization at a temperature from 45° to 85° C. while continuously adding NMA over a period of time such that the free vinyl acetate monomer content of the polymerization reaction is about 2-8% upon completion of the NMA addition.

The balanced performance of the VAE/NMA emulsion copolymer as a binder in the manufacture of nonwoven products, especially the wet tensile strength and absorbency, is achieved by the combined effects of: the up-front, batch addition of all the vinyl acetate monomer; a single anionic surfactant which is sodium salt of an alkylphenoxy poly(ethyleneoxy) sulfate; the controlled NMA delay addition profile; and "hot" (45°-85° C.) initiation.

DETAILED DESCRIPTION OF THE INVENTION

The invention provides a method for making a nonwoven binder emulsion of about 35 to 65 wt % solids comprising an aqueous medium having colloidally dispersed therein a copolymer consisting essentially of vinyl acetate, 5 to 40 wt % ethylene and 2 to 10 wt % NMA, the copolymer emulsion being prepared in the presence of an emulsifying system consisting essentially of an alkylphenoxy poly(ethyleneoxy) sulfate salt having 3-5 ethyleneoxy units. Any suitable salt may be used including the potassium ammonium and preferably sodium salts.

The preferred copolymers consist essentially of vinyl acetate and 5 to 25 wt %, especially 5 to 15 wt %, ethylene with preferably 3 to 7 wt % of the NMA crosslinking comonomer. The copolymers would have a Tg from $-25°$ to $0°$ C., preferably $-15°$ to $0°$ C.

The VAE/NMA copolymers may optionally include one or more additional ethylenically unsaturated copolymerizable monomers at up to 30 wt %.

Contemplated as the functional, or operative, equivalent of vinyl acetate in the copolymer emulsions are vinyl esters of $C_1$–$C_{18}$ alkanoic acids, such as vinyl formate, vinyl propionate, vinyl laurate and the like.

Contemplated as the functional, or operative, equivalent of NMA are the other well known crosslinking mono-olefinically unsaturated monomers N-methylolmethacrylamide and the lower alkyl ethers of N-methylol(meth)acrylamide, such as the isobutoxymethyacrylamide and the like.

Vinyl acetate and ethylene are copolymerized in the presence of the anionic surfactant emulsifying system consisting essentially of a sodium salt of alkylphenoxy poly(ethyleneoxy) sulfate in an aqueous medium under pressures not exceeding about 100 atm and in the presence of a free radical source which is added incrementally, the aqueous system being maintained by a suitable buffering agent at a pH of about 2-6. The process first involves a homogenization in which the vinyl acetate suspended in water is thoroughly agitated in the presence of ethylene under the working pressure to effect solution of the ethylene in the vinyl acetate and aqueous phases, while the reaction medium is gradually heated to polymerization temperature of 45° to 85° C., preferably 50° to 60° C. The homogenization period is followed by a polymerization period during which the free radical source (and optional reducing agent) is added incrementally.

The NMA crosslinking comonomer is added incrementally over the course of the polymerization reaction at such a rate that, upon completion of the NMA addition, the polymerization medium contains 2 to 4 wt % free vinyl acetate monomer.

Various free radical forming sources can be used in carrying out the polymerization of the monomers such as peroxide compounds and combination type systems comprising both reducing agents and oxidizing agents, i.e., a redox system can also be used, preferably t-butyl hydroperoxide and sodium formaldehyde sulfoxylate.

The oxidizing agent is generally employed in an amount of 0.01 to 1%, preferably 0.05 to 0.5%, based on weight of the vinyl acetate introduced into the polymerization system. The reducing agent is ordinarily added as an aqueous solution in the necessary equivalent amount.

The emulsifying agent used is an alkylphenoxy (poly)ethyleneoxy sulfate having alkyl groups containing from about 7 to about 18 carbon atoms, inclusive, and having from about 3 to 5 ethyleneoxy units, preferably about 4 ethyleneoxy units, such as the sodium salts of heptylphenoxy poly(ethyleneoxy) sulfate, nonylphenoxy poly(ethyleneoxy) sulfate, octylphenoxy poly(ethyleneoxy) sulfate and dodecylphenoxy poly(ethyleneoxy) sulfate.

The concentration range of the amount of anionic surfactant used is from 0.5 to 10%, preferably 4 to 5%, based on total polymer.

Vinyl acetate/ethylene copolymer emulsions of relatively high solids can be directly produced, e.g., 40-60% solids.

Examples of suitable anionic surfactants include Alipal CO-433 surfactant [sodium salt of nonylphenoxy poly(ethyleneoxy) sulfate having 4 ethyleneoxy units] available from GAF Chemicals Corp.; Polystep B-27 surfactant [sodium salt of octylphenoxy poly(ethyleneoxy) sulfate having 4 ethylene oxide units] available from Stepan Co.; and Triton X-301 surfactant [sodium salt of alkylaryl poly(ethyleneoxy) sulfate having 3 ethyleneoxy units] available from Rohm & Haas Co.

The reaction temperature can be controlled by the rate of free radical addition and by the rate of heat dissipation. Generally, it is advantageous to maintain a temperature of 45° to 85° C. during the polymerization of the monomers.

Reaction time will depend upon variables such as temperature, the free radical forming source and the desired extent of polymerization. It is generally desirable to continue with the reaction until less than 0.5% of the vinyl acetate remains unreacted.

In carrying out the polymerization, the total amount of vinyl acetate to be used in the polymerization recipe is initially charged to the polymerization vessel and saturated with ethylene. The quantity of ethylene entering into the copolymer is influenced by the pressure, the agitation and the viscosity of the polymerization medium. Thus, to increase the ethylene content of the copolymer, higher pressures, greater agitation and a low viscosity are employed.

The process of forming the VAE/NMA copolymer emulsion generally comprises preparation of an aqueous solution containing the emulsifying system and the pH buffering system. This aqueous solution and the total charge of vinyl acetate are added to the polymerization vessel and ethylene pressure is applied to the desired value. As previously mentioned, the mixture is thoroughly agitated to dissolve ethylene in the vinyl acetate and in the water phase. Conveniently, the charge is brought to polymerization initiation temperature during this agitation. The polymerization is then initiated by introducing initial amounts of the oxidizing agent and the reducing agent. After the polymerization has started, the oxidizing agent and reducing agent are incrementally added as required to continue polymerization, the NMA crosslinking comonomer is added as a delay over a period of time such that upon completion of the NMA addition 2 to 8 wt %, preferably 2 to 4 wt %, of unreacted vinyl acetate monomer remains in the polymerization reaction medium.

As mentioned, the reaction is generally continued until the residual vinyl acetate content is below about 0.5%. The completed reaction product is then allowed to cool to about room temperature while sealed to the atmosphere.

The VAE/NMA copolymer binders of the invention can be used to prepare nonwoven products, or fabrics, especially personal and industrial wipes, by a variety of methods known in the art which, in general, involve the impregnation of a loosely assembled mass of fibers with the binder emulsion, followed by a moderate heating to dry the mass. This moderate heating also serves to cure the binder by forming a crosslinked interpolymer. Before the binder is applied, it is, of course mixed with a suitable catalyst for the crosslinking monomer.

For more information regarding suitable catalysts, methods for manufacturing nonwoven products as well as types of fibers suitable for use see U.S. Pat. No. 4,745,025, which is incorporated by reference.

The amount of copolymer binder, calculated on a dry basis, applied to the fibrous starting web is that amount which is at least sufficient to bind the fibers together to form a self-sustaining web and suitably ranges from about 3 to about 100 wt % or more of the starting web, preferably about 10 to 50 wt % of the starting web. The impregnated web is then dried and cured. The nonwoven products are suitably dried by passing them through air oven or the like and then through a curing oven. Typical conditions to achieve optimal crosslinking are sufficient time and temperature such as drying at 150°-200° F. (66°-93° C.) for 4 to 6 minutes, followed by curing at 300°-310° F. (149°-154° C.) for 3 to 5 minutes or more. However, other time temperature relationships can be employed as is well known in the art. Shorter times at higher temperatures or longer times at lower temperatures being used.

EXAMPLES

Following is a general procedure for preparing a VAE/NMA copolymer emulsion according to the invention. The VAE/NMA copolymer emulsions of Examples 1-4 were prepared essentially following this procedure.

The components of the initial reacted charge and the various delay feeds were as follows:

| Initial Reactor Charge | |
|---|---|
| Water (deionized) | 729.0 g |
| Polystep B-27 | 199.4 g |
| Sodium Acetate | 0.9 g |
| Ferrous Ammonium Sulfate (10% aq soln) | 0.1 ml |
| Vinyl Acetate | 1336.4 g |
| Ethylene-quantity to equilibrate reactor to 900 psig at 50° C. | |
| Delay Feeds | |
| (1) t-Butyl Hydroperoxide (2.6% aq soln) | 471.0 ml |

-continued

| Initial Reactor Charge | |
|---|---|
| (2) Sodium Formaldehyde Sulfoxylate (21% aq soln) | 150.0 ml |
| (3) NMA (29% aq soln) | 286.0 ml |

The aqueous premix medium containing the vinyl acetate monomer, ferrous ammonium sulfate, sodium acetate, anionic surfactant and water was adjusted to about pH 4.5 with acetic acid.

A one gallon stainless steel reactor was filled with the above aqueous premix and purged with nitrogen. With the mixture being agitated at 200 rpm the reactor was purged twice with nitrogen (30 psi) followed by one ethylene purge (30 psi) at 25° C. The agitation speed was increased to 900 rpm and the reactor was pressurized to 900 psig with ethylene (subsurface). The reactor temperature and ethylene pressure were allowed to equilibrate at 50° C. and 900 psig, respectively. The ethylene supply was shut off to the reactor. The reaction was initiated at 50° C. by the addition of the 2.6% t-butylhydroperoxide (TBHP) and the 21% sodium formaldehyde sulfoxylate solution (SFS). The rate of addition of the TBHP and SFS solutions was controlled to maintain a polymerization temperature of about 50° C. with a $\Delta T$ of 5°–10° C. Also upon initiation the aqueous NMA solution was added as a continuous delay. The NMA delay was monitored by the free vinyl acetate monomer as a function of conversion or reaction time in such a way that the free vinyl acetate monomer was decreased to about 2–4% at the end of the NMA delay addition (4.5 hours).

The polymerization reaction was continued until the vinyl acetate monomer content was less than 1%.

The emulsions of Examples 5 and 6 followed the above procedure except that 20% of the vinyl acetate was initially charged to the reactor with the remaining 80% added over 5 hr after initiation as taught in Example 2 of U.S. Pat. No. 4,698,384. The emulsions of Examples 7 and 8 used "cold" initiation as taught in U.S. Pat. No. 4,332,850 with Example 7 having all the vinyl acetate added up front (initial batch charge) and Example 8 having 20% of the vinyl acetate initially charged to the reactor with the remaining 80% added over 5 hr after initiation.

Table 1 provides data regarding the VAE/NMA copolymer emulsions and their performance in a nonwoven binder application.

It can be seen from the data in Table 1 that the VAE/NMA copolymer emulsions of Examples 5 and 6 in which both "hot" initiation and delay NMA addition were used showed decidedly inferior absorbency compared to the Example 1–4 emulsions according to the invention which also showed a polydispersity (Dw/Dn) ranging from about 4 to about 10. Similarly, the VAE/NMA copolymer emulsions of Examples 7 and 8 which used "cold" initiation and up-front batch VAE addition, and "cold" initiation and delay VAE addition, respectively, also showed inferior absorbency compared to the Example 1–4 emulsion of the invention.

STATEMENT OF INDUSTRIAL APPLICATION

The present invention provides a VAE/NMA copolymer emulsion suitable as a binder for making nonwoven products, especially wipes, possessing combination of high wet tensile with good absorbency and hand.

We claim:

1. In a process for making an aqueous vinyl acetate/ethylene/N-methylolacrylamide copolymer emulsion the improvement which comprises:
   (a) adding an initial charge containing all the vinyl acetate monomer to be polymerized and an effective amount of an emulsifying system consisting essentially of a salt of an alkylphenoxy poly(ethyleneoxy) sulfate containing about 3–5 ethyleneoxy units,
   (b) pressurizing the reactor with ethylene,
   (c) initiating polymerization at a temperature from 45° to 85° C., and
   (d) continuing polymerization at a temperature from 45° to 85° C. while continuously adding N-methylolacrylamide over a period of time such that the free vinyl acetate monomer content of the reaction medium is about 2–8% upon completion of the N-methylolacrylamide addition.

2. The process of claim 1 in which the initiation temperature is from 50° to 60° C.

3. The process of claim 1 in which the polymerization reaction temperature is from 50° to 60° C.

4. The process of claim 1 in which the free vinyl acetate monomer content upon the completion of the N-methylolacrylamide addition is about 2–4%.

5. A process for making an aqueous vinyl acetate/ethylene/N-methylolacrylamide copolymer emulsion comprising:
   (a) adding an initial charge containing all the vinyl acetate monomer to be polymerized and from 0.5 to 10 wt %, based on total polymer, of an emulsifying system consisting essentially of a salt of an alkylphenoxy poly(ethyleneoxy) sulfate containing about 3–5 ethyleneoxy units,
   (b) pressurizing the reactor with sufficient ethylene to yield a copolymer having a Tg from −25° to 0° C.,

TABLE 1

| Example | 1 | 2 | 3 | 4 | 5 | 6 | 7 | 8 |
|---|---|---|---|---|---|---|---|---|
| Emulsion | | | | | | | | |
| Tg (°C.) | −13 | −19 | −3.5 | −19 | −13 | −17 | −16 | −16 |
| Solids (%) | 48 | 51 | 55 | 52 | 54.5 | 51.6 | 51.4 | 47.3 |
| Viscosity (cps) | 32 | 75 | 96 | 85 | 1160 | 290 | 95 | 92 |
| Acc. Sed (%) | 2 | 3 | 1 | 1 | 1 | 5 | 1 | 1 |
| Dw (mm) | 0.433 | 0.419 | 0.564 | 0.377 | 0.270 | 0.237 | 0.501 | 0.431 |
| Dn (mm) | 0.070 | 0.067 | 0.069 | 0.064 | 0.084 | 0.074 | 0.077 | 0.075 |
| Dw/Dn | 6.2 | 6.2 | 8.2 | 5.9 | 3.2 | 3.2 | 6.5 | 5.8 |
| THF Insol (%) | 83 | 82 | 94 | 90 | 85 | 82 | 92 | 65 |
| Performance | | | | | | | | |
| Dry Tensile (pli) | 12.4 | 11.1 | 14.2 | 11.4 | 12.5 | 11.1 | 13.1 | 9.7 |
| Wet Tensile (pli) | 6.7 | 5.5 | 7.4 | 6.0 | 7.0 | 5.9 | 7.1 | 4.6 |
| Absorbency (min) | 4.9 | 7.4 | 3.3 | 5.9 | >10 | >10 | >10 | >10 |
| Hand | 71 | 68 | 85 | 56 | 91 | 90 | 89 | 85 |

(c) initiating polymerization at a temperature from 50° to 60° C., and (d) continuing polymerization at a temperature from 50° to 60° C. while continuously adding 2 to 10 wt %, based on copolymer, N-methylolacrylamide over a period of time such that the free vinyl acetate monomer content of the reaction medium is about 2-4% upon completion of the N-methylolacrylamide addition.

6. The process of claim 5 in which the emulsifying system consists essentially of a salt of an octyl- or nonylphenoxy poly(ethyleneoxy) sulfate containing about 3-5 ethyleneoxy units.

7. The process of claim 5 in which the emulsifying system consists essentially of a salt of an octylphenoxy poly(ethyleneoxy) sulfate containing about 3-5 ethyleneoxy units.

8. A process for making an aqueous vinyl acetate/ethylene/N-methylolacrylamide copolymer emulsion comprising:

(a) adding an initial charge containing all the vinyl acetate monomer to be polymerized and from 4 to 5 wt %, based on total polymer, of an emulsifying system consisting essentially of a sodium salt of an octyl- or nonylphenoxy poly(ethyleneoxy) sulfate containing about 4 ethyleneoxy units, (b) pressurizing the reactor with sufficient ethylene to yield a copolymer having a Tg from $-15°$ to $0°$ C., (c) initiating polymerization at a temperature from 50° to 60° C., and (d) continuing polymerization at a temperature from 50° to 60° C. while continuously adding 3 to 7 wt %, based on copolymer, N-methylolacrylamide over a period of time such that the free vinyl acetate monomer content of the reaction medium is about 2-4% upon completion of the N-methylolacrylamide addition.

9. The process of claim 8 in which the emulsifying system consists essentially of a sodium salt of an octylphenoxy poly(ethyleneoxy) sulfate containing about 4 ethyleneoxy units.

* * * * *